United States Patent
Mangiaracina et al.

(10) Patent No.: US 9,270,143 B1
(45) Date of Patent: Feb. 23, 2016

(54) SYSTEMS, METHODS, AND DEVICES FOR PROVIDING DRIVE ELECTRONICS WITH A BACKUP POWER SUPPLY FOR AN LED LUMINAIRE

(75) Inventors: Anthony A. Mangiaracina, Mobile, AL (US); Kevin Odith Porter, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 717 days.

(21) Appl. No.: 13/563,789

(22) Filed: Aug. 1, 2012

Related U.S. Application Data

(60) Provisional application No. 61/514,242, filed on Aug. 2, 2011.

(51) Int. Cl.
*H02J 9/00* (2006.01)
*H02J 9/06* (2006.01)

(52) U.S. Cl.
CPC ...................... *H02J 9/062* (2013.01)

(58) Field of Classification Search
CPC ........ G08G 1/095; H02J 7/0068; H02M 5/42; H05B 7/02
See application file for complete search history.

(56) References Cited

U.S. PATENT DOCUMENTS

| | | | | |
|---|---|---|---|---|
| 5,661,645 A | * | 8/1997 | Hochstein | 363/89 |
| 5,897,194 A | * | 4/1999 | Ham | G08B 7/062 |
| | | | | 200/310 |
| 2002/0027510 A1 | * | 3/2002 | Jones et al. | 340/907 |
| 2009/0302153 A1 | * | 12/2009 | Matasso et al. | 244/99.2 |
| 2010/0295482 A1 | * | 11/2010 | Chemel et al. | 315/312 |

* cited by examiner

*Primary Examiner* — Jared Fureman
*Assistant Examiner* — Rafael Pacheco
(74) *Attorney, Agent, or Firm* — King & Spalding LLP

(57) ABSTRACT

Systems and methods for providing a combination power supply module containing the main drive electronics and backup drive electronics along with a backup power supply for a light emitting diode (LED) based luminaire are described herein. The power supply module may include a main LED driver that is electrically connected to a main power supply through active power factor correction circuitry and is also electrically connected to an LED or array of LEDs. The power supply module further includes power management circuitry electrically connected to a backup power supply and an emergency LED driver, where the power management circuitry discharges the backup power supply to supply power to the emergency LED driver for powering at least a subset of the LEDs when power is no longer being supplied to the main LED driver. The main LED driver and the emergency LED driver are contained in the same module housing.

11 Claims, 5 Drawing Sheets

SYSTEMS, METHODS, AND DEVICES FOR PROVIDING DRIVE ELECTRONICS WITH A BACKUP POWER SUPPLY FOR AN LED LUMINAIRE

RELATED APPLICATIONS

This application claims priority under 35 U.S.C. §119 to U.S. Provisional Patent Application No. 61/514,242, filed Aug. 2, 2011, titled "Systems, Methods, and Devices for Providing Drive Electronics with a Backup Power Supply for an LED Luminaire." The foregoing application is hereby incorporated herein in its entirety.

TECHNICAL FIELD

Embodiments of the invention relate generally to lighting solutions, and more particularly to systems, methods, and devices for providing drive electronics with a backup power supply for a light emitting diode (LED) luminaire.

BACKGROUND

Existing power supply modules for an LED luminaire are limited. Accordingly, there is a need for systems and methods for providing a combination power supply module containing the main drive electronics and backup drive electronics along with a backup power supply for an LED based luminaire. There is a further need for a power supply module that includes a main LED driver that is electrically connected to a main power supply and is also electrically connected to an LED or array of LEDs. There is yet a further need for a power supply module that includes power management circuitry electrically connected to a backup power supply and an emergency LED driver. There is yet a further need for a main LED driver and the emergency LED driver being contained in the same module housing. These and other needs can be addressed by the embodiments described herein.

SUMMARY

Systems and methods for providing a power supply module containing both main drive electronics and backup drive electronics along with a backup power supply for a light emitting diode (LED) based luminaire are described herein. According to an embodiment of the invention, there is disclosed a power supply module that may include a main LED driver, where the main LED driver is electrically connected to a main power supply through active power factor correction circuitry and also electrically connected to an LED or an array of LEDs. The power supply module further includes power management circuitry electrically connected to a backup power supply and an emergency LED driver, where the power management circuitry discharges the backup power supply to supply power to the emergency LED driver when power is no longer being supplied to the main LED driver. In that instance, the emergency LED driver then provides power to the LED (or at least a subset of the array of LEDs). The main LED driver and the emergency LED driver are contained in the same module housing.

In accordance with one aspect of the invention, the backup power supply includes at least one super capacitor. According to another aspect of the invention, the backup power supply includes at least one nickel metal hydride, nickel cadmium, lithium, iron chloride, or CU+ battery. In accordance with yet another aspect of the invention, the backup power supply includes a combination of at least one super capacitor and at least one battery. According to another aspect of the invention, the active power factor correction circuitry includes a buck, boost, buck-boost, septic, or flyback switched power supply circuit topology. In accordance with yet another aspect of the invention, the number of LEDs in an array of LEDs is one.

In accordance with another embodiment of the invention, there is disclosed a method for providing backup power to a light emitting diode (LED) based luminaire that includes detecting a power outage condition, where the power outage condition indicates that a main LED driver is no longer providing power to an array of LEDs, and discharging a backup power supply to power an emergency LED driver. The method further includes powering at least a subset of the array of LEDs with the emergency LED driver. According to one aspect of the invention, the method further includes providing the main LED driver, backup power supply, and emergency LED driver in a module housing. In accordance with another aspect of the invention, the method further includes providing the main LED driver, backup power supply, and emergency LED driver in the same module housing.

According to one aspect of the invention, the method further includes charging the backup power supply prior to detecting a power outage condition. In accordance with another aspect of the invention, charging the backup power supply includes charging the backup power supply from an unswitched AC main power source. According to yet another aspect of the invention, detecting a power outage condition includes detecting a loss of power to the main LED driver. In accordance with another aspect of the invention, detecting a loss of power to the main LED driver includes detecting a loss of power delivery from a switched AC main power source. According to yet another aspect of the invention, detecting a power outage condition includes detecting a failure mode in the main LED driver.

BRIEF DESCRIPTION OF THE FIGURES

Figure 1A:
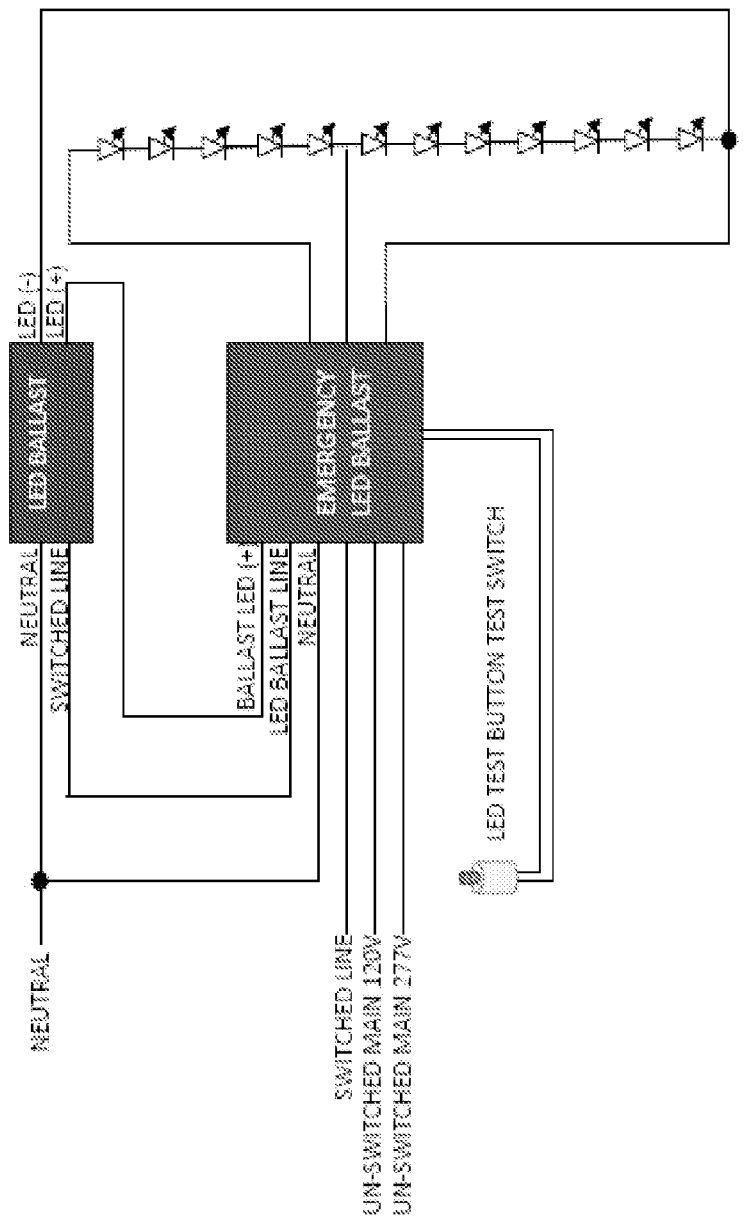

Having thus described the invention in general terms, reference will now be made to the accompanying drawings, which are not necessarily drawn to scale, and wherein:

FIG. 1A is a block diagram of an example of a typical LED ballast (or driver) and emergency LED ballast (or driver) configuration in accordance with an example embodiment of the invention.

Figure 1B:
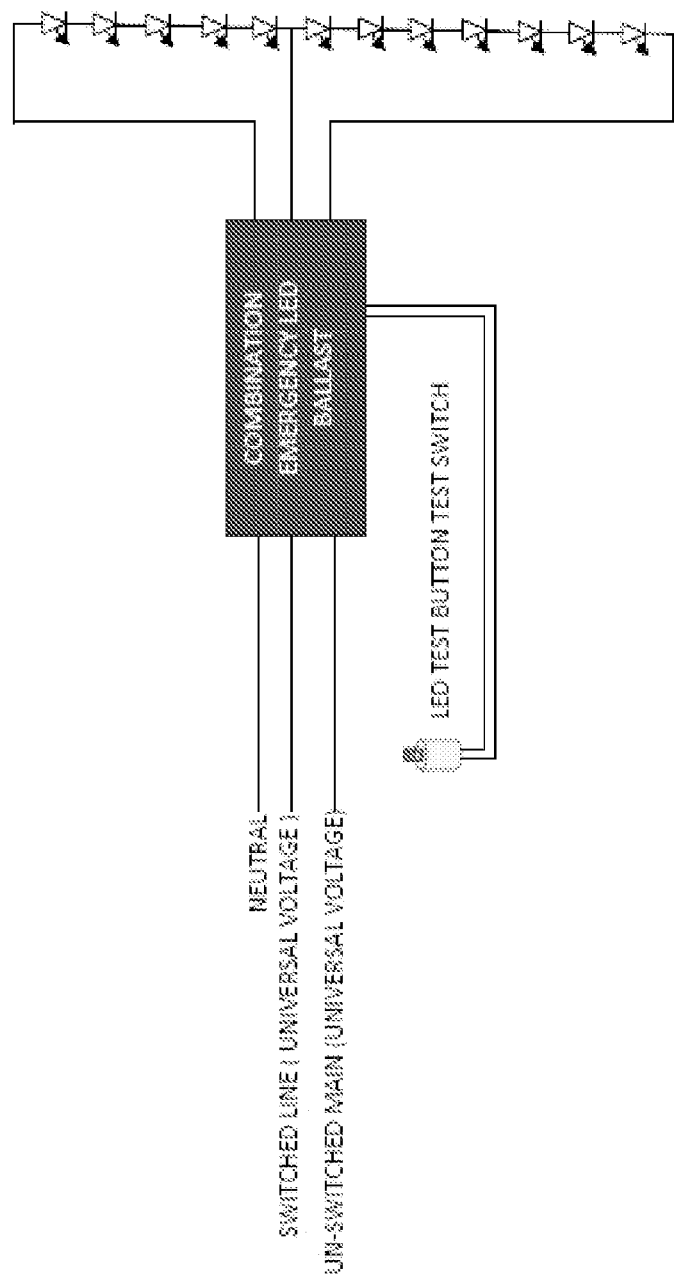

FIG. 1B is a block diagram of a combination LED ballast (or driver) providing the drive electronics for both normal and emergency operation in the same module housing in accordance with an example embodiment of the invention.

Figure 1C:
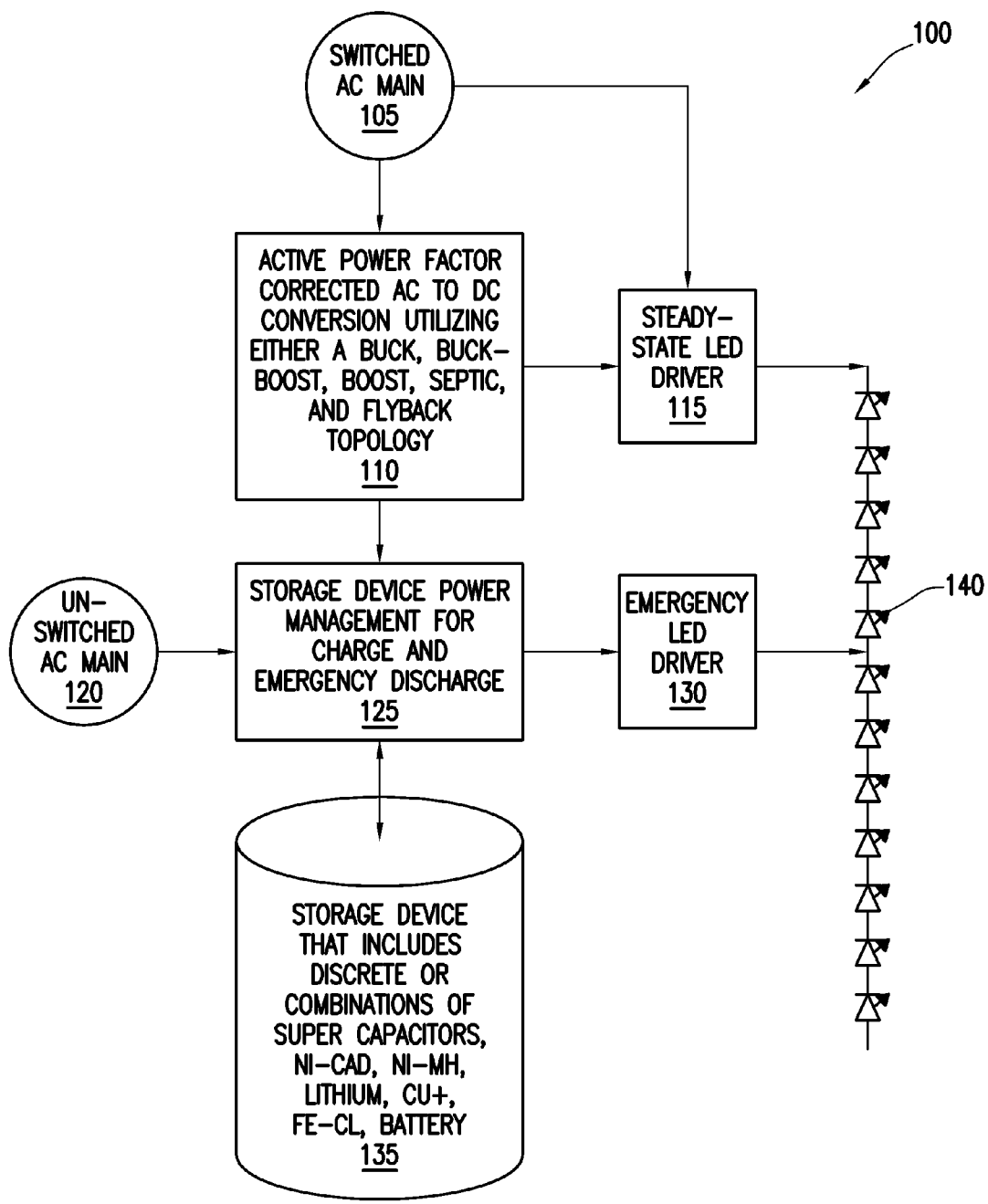

FIG. 1C is a block diagram of the LED emergency driver in accordance with an example embodiment of the invention.

Figure 2:
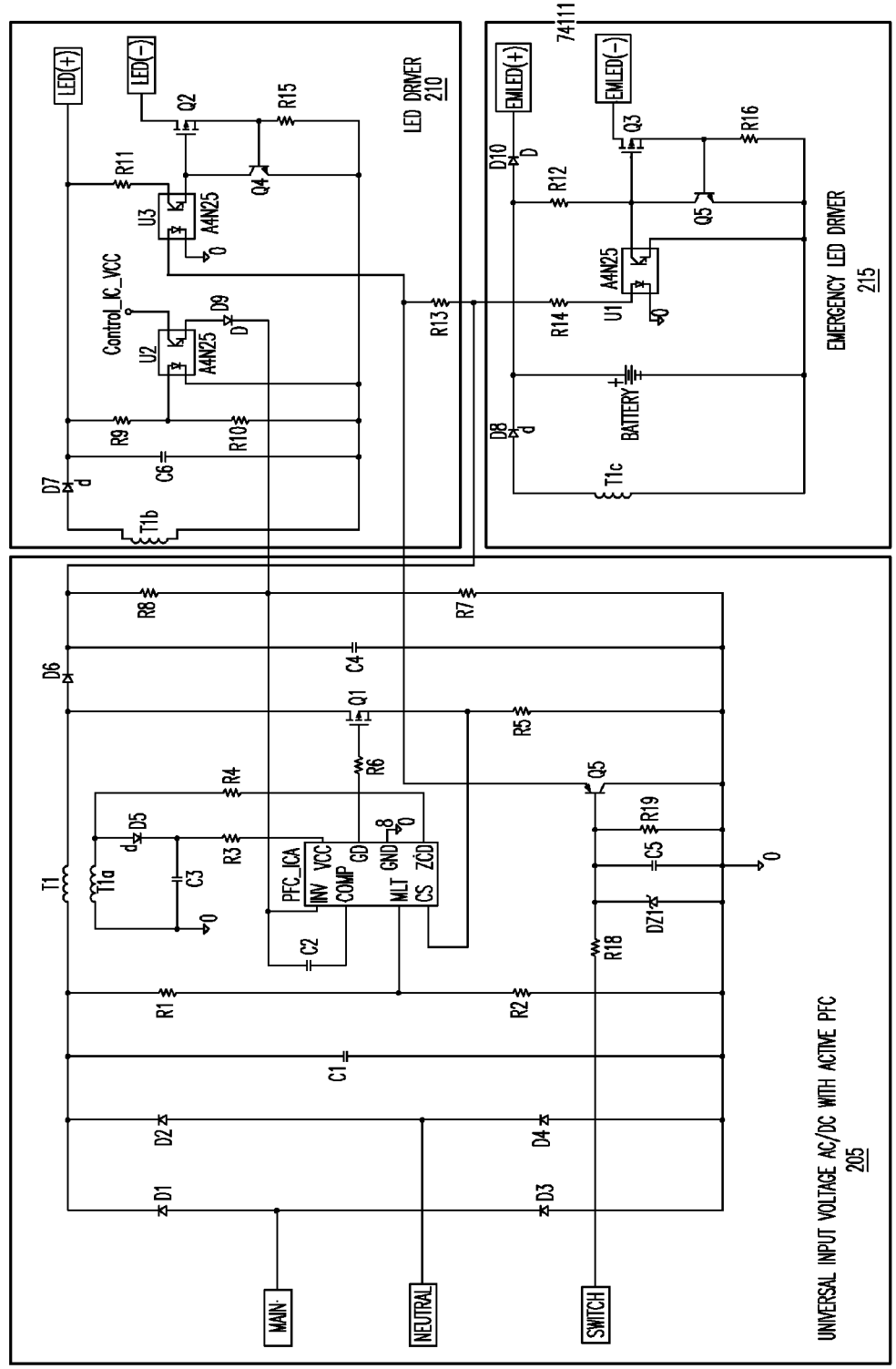

FIG. 2 is a circuit diagram of the backup LED driver in accordance with an example embodiment of the invention.

Figure 3:
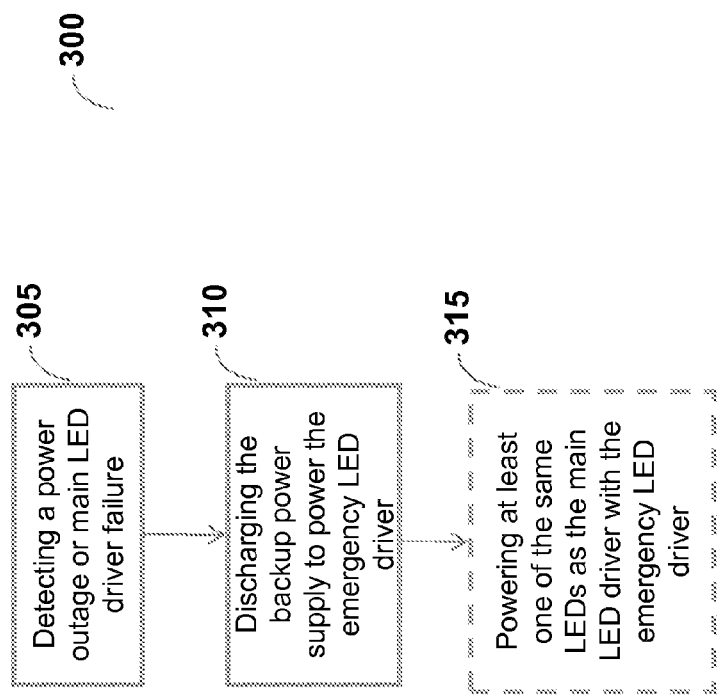

FIG. 3 illustrates a method of operating the backup LED driver in accordance with one embodiment of the invention.

DETAILED DESCRIPTION OF EXEMPLARY EMBODIMENTS

Exemplary embodiments of the invention are directed to drive electronics for LED light fixtures configured to provide main and backup drive electronics in the same module housing, thereby reducing the cost as well as the design and/or manufacturing complexity (i.e., less components, less chance of incorrectly wiring or incorrectly installing separate driver components, less chance of misapplication, etc.) of having separated main and backup LED drivers. The systems and methods described herein may provide several additional advantages including the ability to provide power to an LED light source powered by an AC source or powered by a battery for emergency/backup operation using the same drive electronics module.

The systems, methods, and apparatuses described herein may also provide compatibility with multiple voltage options such as 120, 240, or 277 VAC systems, or a universal voltage option allowing for 50-60 Hz 100V through 347 AC. Some embodiments of the invention may practice single wire multiple voltage input using capacitive coupling or single wire universal voltage input using a switched mode power supply. The systems, methods, and apparatuses described herein may also provide for expanded operating temperatures, a quick recharge through the use of super capacitors in certain embodiments, and/or compatibility with a wide variety of linear fluorescent ballasts and lamps.

Exemplary embodiments of the invention now will be described more fully hereinafter with reference to the accompanying drawings, in which the example embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like numbers refer to like, but non necessarily the same, elements throughout.

FIG. 1A is a block diagram of an example of a typical LED ballast (or driver) and emergency LED ballast (or driver) configuration with a test button (or switch) connected to the emergency LED ballast for testing that it is functioning properly. FIG. 1B is a block diagram of a combination LED ballast (or driver) providing the drive electronics for both normal and emergency operation in the same module housing in accordance with an example embodiment of the invention. The embodiment shown in FIG. 1B includes a test button (or switch) for testing the operation of the module in an emergency (i.e., power failure) situation while reducing the cost as well as the design and/or manufacturing complexity (i.e., less components, less chance of incorrectly wiring or incorrectly installing separate driver components, less chance of misapplication, etc.) of having separate main and backup LED drivers.

FIG. 1C is a block diagram of a power delivery system 100 having an emergency LED driver 130 with a backup power supply 135 in accordance with an example embodiment of the invention. As shown in FIG. 1C, a switched AC main power source 105 provides AC power to an LED driver 115, which in turn may provide a DC output (e.g., a steady DC output or pulsed DC output) to one or more LEDs 140. The LED driver 115 output may be a voltage source or a current source, depending on the desired application. In the example embodiment of FIG. 1C, the switched AC main power source 105 may also be electrically connected to active power factor correction circuitry 110 that provides AC to DC conversion using one of several switched-mode power supply circuit topologies (including either isolated converter or non-isolated converter topologies) such as a Buck, Buck-Boost, Boost, Septic, or Flyback topology or any combination thereof.

As shown in the example embodiment of FIG. 1C, the active power factor correction circuitry 110 may provide an output to the LED driver 115 as well as the power management circuitry 125 for charging and discharging a backup power supply 135. The backup power supply may include one or more of (or combination of) NI-CAD, NI-MH, Lithium, CU+, Fe-CL batteries or super capacitors (or a combination of batteries and super capacitors). Also shown in the embodiment of FIG. 1C, is an unswitched AC main power source 120 that is electrically connected to the power management circuitry 125 to provide a means of charging the backup power supply 135 while the emergency LED driver 130 is dormant. In the event of a power failure of the switched AC main power source 105 (or in the event of a failure of the main LED driver 115), the power management circuitry 125 discharges the backup power supply 135 to power the emergency LED driver 130 to provide power to the LEDs 140 or to a subset of LEDs 140. In some embodiments of the invention, the subset of LEDs 140 may be powered to either provide a visual indication of an emergency or backup power engagement through the light output, and/or to extend the length of time the subset of LEDs 140 may be powered by the backup power supply 135.

FIG. 2 is an circuit diagram 200 of the backup LED driver in accordance with an example embodiment of the invention. As shown in the example circuit diagram of FIG. 2, the circuit diagram is broken down into three segments: power input and active power factor correction circuitry 205, the main LED driver circuitry 210, and emergency LED driver circuitry 215 (which includes the backup power supply), providing an example embodiment of the system described in FIG. 1. The LED driver circuitry 210 and/or emergency LED driver circuitry 215 may be isolated for increased component mounting flexibility.

FIG. 3 illustrates a method 300 of operating the backup LED driver in accordance with one exemplary embodiment of the invention. As shown in FIG. 3, the method 300 begins at block 305 when detecting a power failure condition (or alternatively a main driver failure condition is detected) and block 310 is invoked where the power management circuitry discharges the backup power supply to supply backup power to the emergency LED driver, which in turn, invokes block 315 where at least a subset of the LEDs are supplied power by the emergency LED driver. In some exemplary embodiments of the invention, a subset of LEDs may be powered to either provide a visual indication of an emergency or backup power engagement through the light output, and/or to extend the length of time the subset of LEDs may be powered by the backup power supply. In other exemplary embodiments of the invention, additional steps may be performed including restoring use of the main LED driver when the circuitry detects a reconnection (or reactivation) of the main power source.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

We claim:

1. A power supply module for a light emitting diode (LED) based luminaire comprising:
   a main LED driver, wherein the main LED driver is electrically coupled to a main power supply through an active power factor correction circuitry and electrically coupled to an array of LEDs;
   a power management circuitry electrically coupled to a backup power storage, the active power factor correction circuitry, and an emergency LED driver, wherein the power management circuitry is configured to receive an output of the active power factor correction circuitry to charge and discharge the backup power storage, wherein the power management circuitry discharges the backup power storage to supply power to the emergency LED driver when power is no longer being supplied to the main LED driver, wherein the emergency LED driver powers at least a subset of the array of LEDs using the discharged power from the backup power storage, and wherein the main LED driver and the emergency LED driver are contained in a same module housing.

2. The power supply module of claim 1, wherein the backup power supply includes at least one super capacitor.

3. The power supply module of claim 1, wherein the backup power supply includes at least one of nickel metal hydride, nickel cadmium, lithium, iron chloride, or CU+ battery.

4. The power supply module of claim 1, wherein the backup power supply includes a combination of at least one super capacitor and at least one battery.

5. The power supply module of claim 1, wherein the active power factor correction circuitry includes a buck, a boost, a buck-boost, a septic, or a flyback switched power supply circuit topology.

6. The power supply module of claim 1, wherein the number of LEDs in an array of LEDs is one.

7. A method for providing backup power to a light emitting diode (LED) based luminaire comprising:
detecting a power outage condition,
wherein the power outage condition indicates that a main LED driver is no longer providing power to an array of LEDs that is electrically coupled to the main LED driver,
wherein the power outage condition is detected based on an output of an active power factor correction circuitry, and
wherein the main LED driver is electrically coupled to a main power supply through the active power factor correction circuitry;
responsive to detecting the power outage condition, discharging a backup power supply to power an emergency LED driver;
powering at least a subset of the array of LEDs with the emergency LED driver;
providing the main LED driver, the backup power supply, and the emergency LED driver in a same module housing.

8. The method of claim 7, further comprising the step of prior to detecting the power outage condition, charging the backup power supply.

9. The method of claim 7, wherein charging the backup power supply comprises charging the backup power supply from an unswitched AC main power source.

10. The method of claim 7, wherein detecting the power outage condition comprises detecting a loss of power to the main LED driver.

11. The method of claim 7, wherein detecting the power outage condition comprises detecting a failure mode in the main LED driver.

* * * * *